US008526727B2

(12) United States Patent
Maltz et al.

(10) Patent No.: US 8,526,727 B2
(45) Date of Patent: Sep. 3, 2013

(54) HIERARCHICAL MULTIDIMENSIONAL LOOKUP TABLE GENERATION

(75) Inventors: Martin S. Maltz, Rochester, NY (US); Raja Bala, Pittsford, NY (US); Lalit Keshav Mestha, Fairport, NY (US)

(73) Assignee: Xerox Corporation, Norwalk, CT (US)

(*) Notice: Subject to any disclaimer, the term of this patent is extended or adjusted under 35 U.S.C. 154(b) by 642 days.

(21) Appl. No.: 12/815,823

(22) Filed: Jun. 15, 2010

(65) Prior Publication Data
US 2011/0305389 A1 Dec. 15, 2011

(51) Int. Cl.
*G06K 9/00* (2006.01)
*G06K 9/36* (2006.01)
*G06K 1/00* (2006.01)
*G06F 15/00* (2006.01)
*H04N 1/60* (2006.01)
*G03F 3/08* (2006.01)
*G09G 5/02* (2006.01)

(52) U.S. Cl.
USPC ............ 382/167; 382/276; 358/1.9; 358/518; 345/604

(58) Field of Classification Search
USPC ........... 382/167, 276; 358/1.9, 518; 345/604
See application file for complete search history.

(56) References Cited

U.S. PATENT DOCUMENTS

| | | | |
|---|---|---|---|
| 6,621,498 B1 * | 9/2003 | Handley et al. | 345/604 |
| 6,766,051 B2 | 7/2004 | Klassen et al. | |
| 7,528,971 B2 | 5/2009 | Harrington | |
| 2009/0190144 A1 * | 7/2009 | Bala et al. | 358/1.9 |
| 2011/0286015 A1 * | 11/2011 | Maltz et al. | 358/1.9 |
| 2011/0299128 A1 * | 12/2011 | Mestha et al. | 358/3.26 |

OTHER PUBLICATIONS

Dianat, S.—"Dynamic optimization algorithm for generating inverse printer map with reduced measurements"—IEEE 2006; pp. 1172-1175.*

* cited by examiner

*Primary Examiner* — Bernard Krasnic
(74) *Attorney, Agent, or Firm* — Philip E. Blair; Fleit Gibbons Gutman Bongini & Bianco P.L.

(57) ABSTRACT

A system and method for generating a hierarchical LUT for implementing a color transformation within a color imaging system. In one embodiment, a coarse LUT is received which comprises a plurality of sub-cubes arrayed on a plurality of coarse levels on a structured coarse grid. Each of the sub-cubes encompasses at least one coarse LUT node. Sub-cubes in the coarse grid are identified that are bisected by a boundary surface of the gamut. Then, each of the identified coarse LUT sub-cubes are associated with fine LUT which comprises a plurality of fine LUT nodes arrayed on a plurality of fine levels on a structured fine grid. A hierarchical LUT is generated from the coarse LUT and the associated fine LUTs. Thereafter, the hierarchical LUT can be used for color transformation within a color imaging system.

21 Claims, 8 Drawing Sheets

HIERARCHICAL MULTIDIMENSIONAL LOOKUP TABLE GENERATION

TECHNICAL FIELD

The present invention is directed to systems and methods for generating a hierarchical multidimensional lookup table (LUT) for performing color transformations in a digital imaging system.

BACKGROUND

An image processor must be able to satisfactorily transform images, prepared for rendering on a staggeringly large number of source devices, for rendering on an equally large number of rendering devices. For example, a personal computer, configured to operate as an image processor, through the use of, for example, a web browser, word processor, or desktop publishing software, must be able to accept images created or downloaded from almost anywhere, and render the images pleasingly on any image output terminal the user connects to the personal computer. The image processor must be able to pleasingly display images on a computer screen and send commands to have images rendered pleasingly on any printer the user connects to the personal computer. Similarly, document processors and copiers must transform images pleasingly and accurately. Indeed, in document processors and copiers, color accuracy requirements can be very stringent.

Typically transformations are carried using lookup tables. For example, an image prepared for rendering in a RGB color space of a computer monitor, is transformed into a CMYK color space of a printer, using a three-dimensional lookup table. Each of the RGB parameters is used as an axis or index into the lookup table. The RGB parameters are typically represented by 8-bit values for each of the R, G, and B components. Such a 24-bit RGB vector is capable of addressing over 16.77 million locations or describing over 16.77 million colors. However, lookup tables of this size are physically impractical in most cases. Therefore, such lookup tables are typically partitioned into a smaller size, such as, for example, 16×16×16 (4096) table locations or LUT nodes. Each LUT node stores, for example, a CMYK value. CMYK values of points not directly represented by nodes, are determined by a form of interpolation among nodes of the lookup table (LUT). Such rendering LUTs are used in PostScript and ICC image paths to find the colorant values needed to render desired input colors. The location of the nodes has generally been determined based on function curvature. In many approaches, addressing the appropriate nodes and interpolating between them has been difficult. Further, it has been found that the biggest errors in a rendering LUT (LAB to CMYK, for example) are for colors near the boundary of the gamut in the input space of the LUT.

Accordingly, what is needed in this art are increasingly sophisticated systems and methods for generating a hierarchical multidimensional rendering lookup table (LUT) that increases the sampling density in the nodes that are cut by the gamut boundary.

INCORPORATED REFERENCES

The following U.S. patents, U.S. patent applications, and Publications are incorporated herein in their entirety by reference "Adaptive Tree-Base Lookup For Non-Separably Divided Color Tables", U.S. Pat. No. 6,766,051 to Klassen et al.

BRIEF SUMMARY

What is disclosed is a novel system and method for generating a hierarchical multidimensional rendering lookup table (LUT) for implementing a color transformation within a color imaging system. The present method increases the accuracy without greatly increasing the number of nodes required. Advantageously, maintaining only two levels of resolution, coarse and fine, simplifies addressing and interpolation in a real-time image rendering path that supports a hierarchical LUT transform.

In one preferred embodiment, the present method for generating a hierarchical LUT for implementing a color transformation within a color imaging system involves the following. A coarse LUT is received which comprises a plurality of coarse nodes arrayed at the intersections of a structured coarse grid. The levels of the coarse grid need not be uniformly spaced. The coarse grid divides the color space in which it is embedded into a plurality of sub-cubes, with coarse grid nodes at the corners. Additional levels are defined between the levels of the coarse grid. These levels also do not have to be uniformly spaced. The combined coarse and fine grid levels define a fine grid. Sub-cubes in the coarse grid are identified that are bisected by a boundary surface of the gamut of a marking or display device. Then each of the identified coarse LUT sub-cubes are associated with a fine LUT with fine LUT nodes at the grid points of the fine grid that lie within the bisected coarse LUT sub-cube. A hierarchical multidimensional LUT is generated from the coarse LUT and the identified sub-cubes and their corresponding fine LUTs. Thereafter, the hierarchical multidimensional LUT can be used to build a highly accurate transform for real-time image correction.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
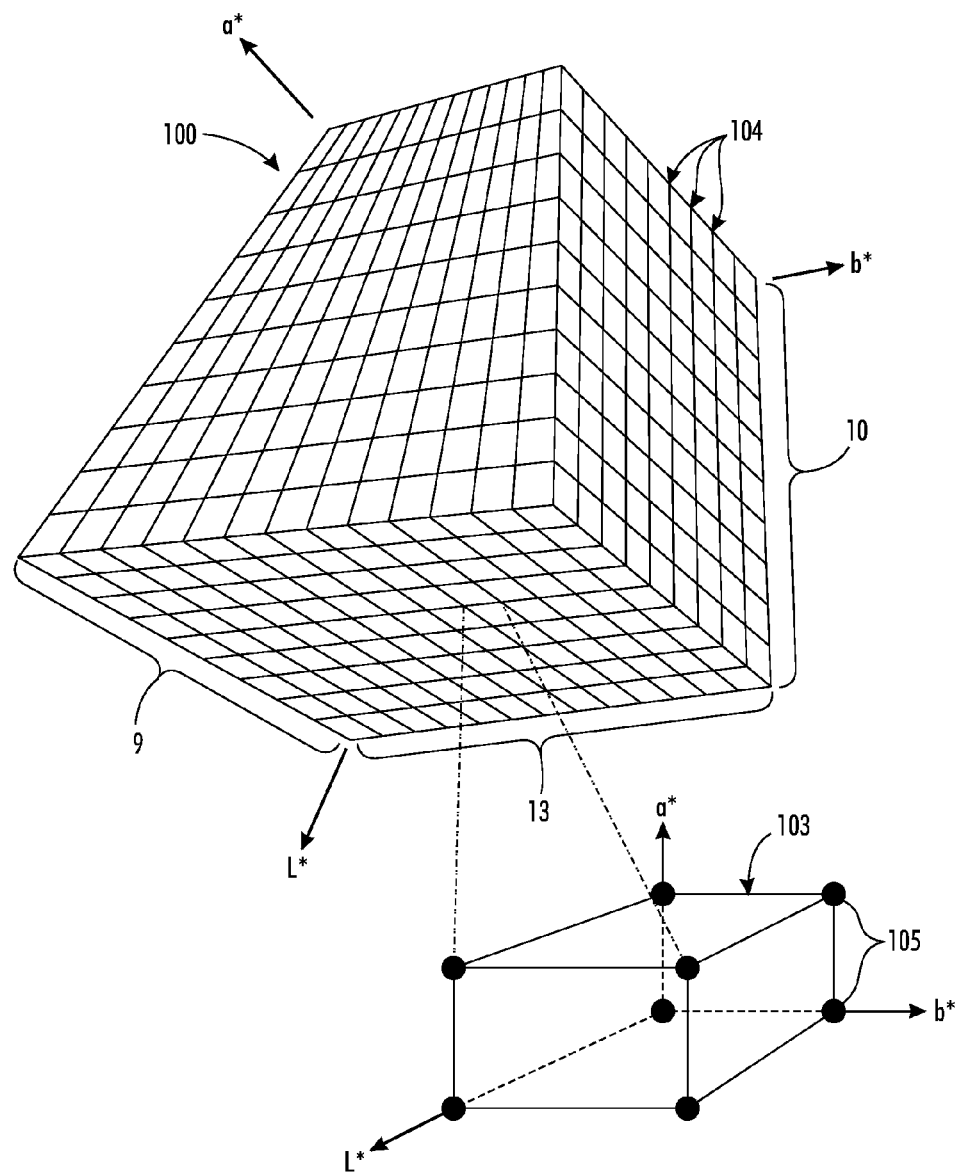
FIG. 1 shows an example structured coarse grid 100 comprising a plurality of coarse LUT sub-cubes arrayed on a plurality of coarse levels 104.

What is disclosed is novel system and method for generating a hierarchical multidimensional rendering lookup table (LUT) that increases the sampling density in the nodes that are cut by the gamut boundary.

A L*a*b* space is a color-opponent space whose coordinates are given by {L*, a*, b*} with dimension L* for luminance and a* and b* for the color-opponent dimensions based on non-linearly compressed CIE XYZ color space coordinates.

The "gamut" refers to a complete subset of color values in a given color space. The gamut of a color marking device is a region of color space containing the colors that can be made by the marking device.

A "LUT", in the present context, refers to a multidimensional lookup table used to profile a color device.

A "multidimensional LUT" for mapping colors to device values for a printer comprises a series of nodes in an input color space (L*a*b* or XYZ) and device-specific (CMYK) output values stored at each node. Generally, tiling in a multidimensional LUT is even and regular, i.e., each tile is a sub-cube on a rectangular lattice. A multi-dimensional LUT generally has finite nodes for which device-specific color values are calculated during profile creation. Section 7.8 of the above-identified text: "Control of Color Imaging Systems: Analysis and Design" and Chapter 5 of aforementioned text "Digital Color Imaging Handbook" describe how to construct a multidimensional LUT.

A "structured coarse grid" is a partitioning of color space into a plurality of coarse LUT sub-cubes arrayed on a plurality of coarse LUT levels. The vertices of each sub-cube are referred to as coarse LUT nodes. The granularity of the coarse grid is a matter of choice based upon the color space, the complexity of the transformations employed and storage and memory constraints for representing the LUT. The structured coarse grid encompasses the entire gamut within its boundaries. For purposes hereof, the structured coarse grid does not have to be quantized into uniformly spaced and regularly shaped coarse LUT sub-cubes.

A "structured fine grid" is a partitioning of color space into a plurality of fine LUT nodes arrayed on a plurality of fine LUT levels. The granularity of the structured fine grid is much finer than the granularity of the coarse grid, i.e., comprises a higher degree of quantization. A set of fine LUT nodes for a given coarse LUT sub-cube is created by dividing the space between neighboring coarse LUT nodes into a defined number of partitions. The fine LUT nodes within a given coarse LUT sub-cube do not have to be uniformly spaced.

A "gamut mapping function" refers to an algorithm or strategy which defines a relationship between a set of input color values of a first gamut to a corresponding set of output values of a second gamut. Gamut mapping methods map received color values of an input image to the target gamut of the output device such that the rendered output colors remain visually consistent with the original image. There is no single common gamut mapping strategy. Background and a survey of the gamut mapping literature may be found in Chapter 10 of aforementioned text "Digital Color Imaging Handbook".

A "storage device" refers to a device or system to store electronic documents or images. Storage devices include RAM, ROM, processor cache, CD-ROM, DVD, flash drives, hard drives, and other media capable of storing electronic documents or images thereof. Another example storage device is a database, as are well known in the arts, placed in communication with a computer workstation or server, for example, that is either remote from or collocated with a device hosting a computing process that accesses and/or stores documents within the storage system. A storage device may reside within an image processing system or be placed in communication with such a system.

Reference is now being made to FIGS. 1-4. It should be appreciated that FIGS. 1-4 are illustrative and are for explanatory purposes.

FIG. 1 shows an example structured coarse grid 100 comprising a plurality of coarse LUT sub-cubes arrayed on a plurality of coarse levels 104. Example coarse LUT sub-cube 103 has 8 coarse LUT nodes 105, each defining a coarse color value.

Figure 2:
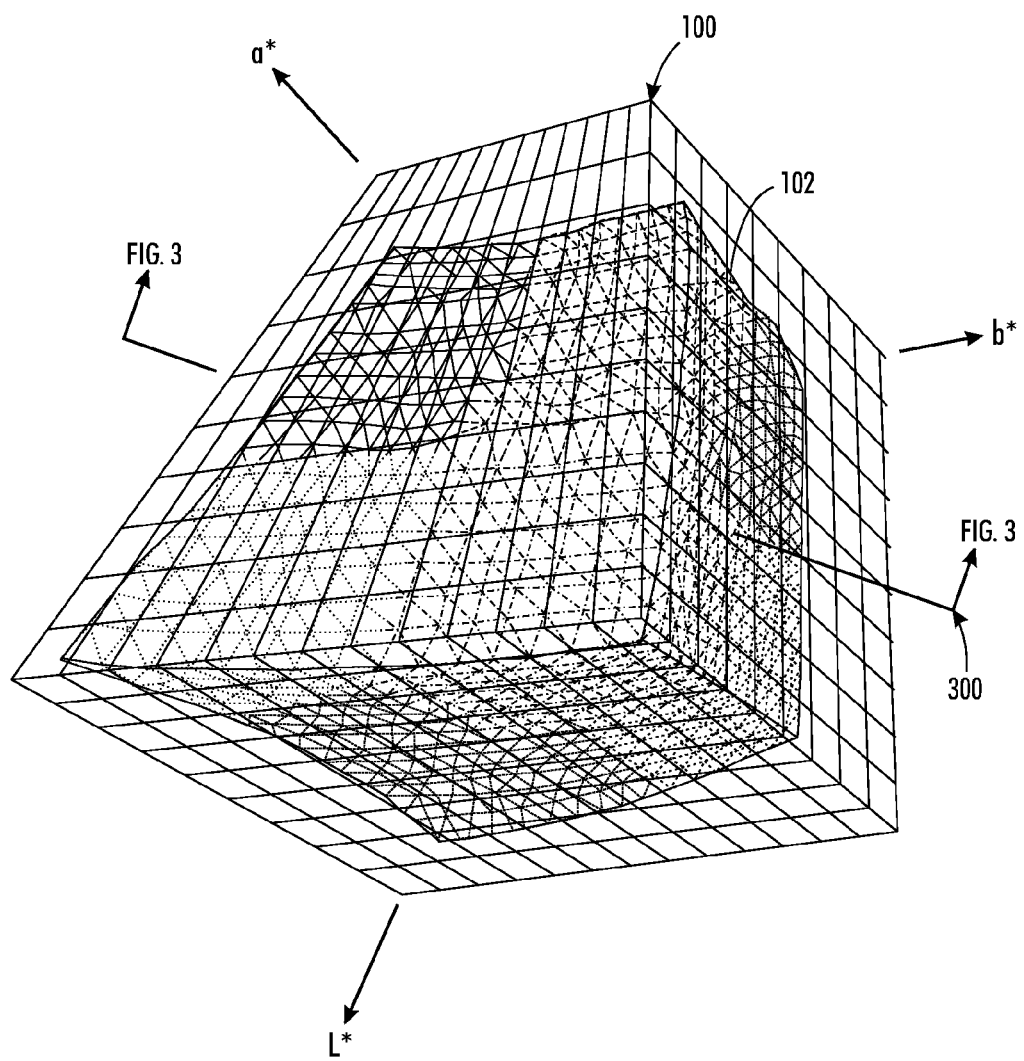
FIG. 2 shows the structured coarse grid of FIG. 1 encompassing an example color space as defined by gamut 102.

FIG. 2 shows the structured coarse grid of FIG. 1 encompassing an example marking device gamut 102. Gamut 102 has been transected by the plurality of coarse levels. As a result, there are coarse LUT sub-cubes which reside entirely inside the boundary surface of the gamut 102. There are coarse LUT sub-cubes which reside entirely outside the boundary surface of the gamut 102. And, there are coarse LUT sub-cubes which reside partially inside the boundary surface of the gamut and partially outside the surface of the gamut 102.

Figure 3:
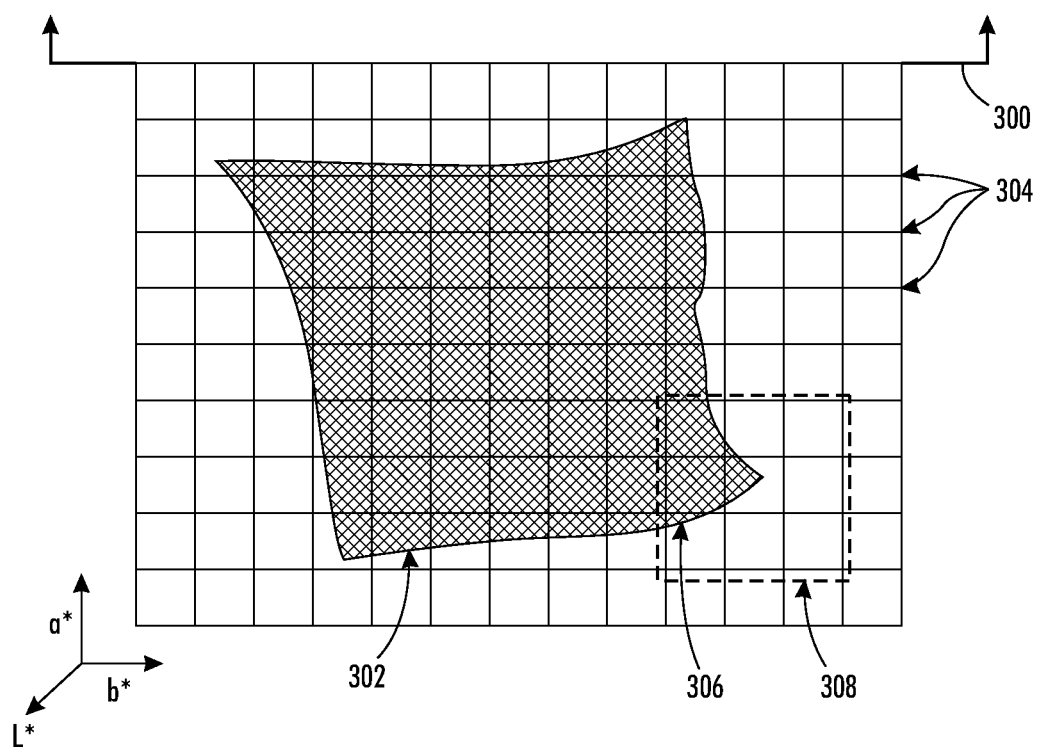
FIG. 3 illustrates a slice of the structured coarse grid of FIG. 2.

FIG. 3 illustrates a slice of the structured coarse grid of FIG. 3 along a plane 300. In this perspective, gamut slice 302 is shown facing the page and bisected by a plurality of coarse levels 304. As can be seen from this perspective, there are coarse LUT sub-cubes which are entirely inside the gamut, and there are a plurality of coarse LUT sub-cubes which are entirely outside the gamut. There are coarse LUT sub-cubes which are bisected by the boundary surface of the gamut. One example 3×3 subset 308 of coarse LUT sub-cubes enclosing gamut portion 306 is shown in FIG. 4.

Figure 4:
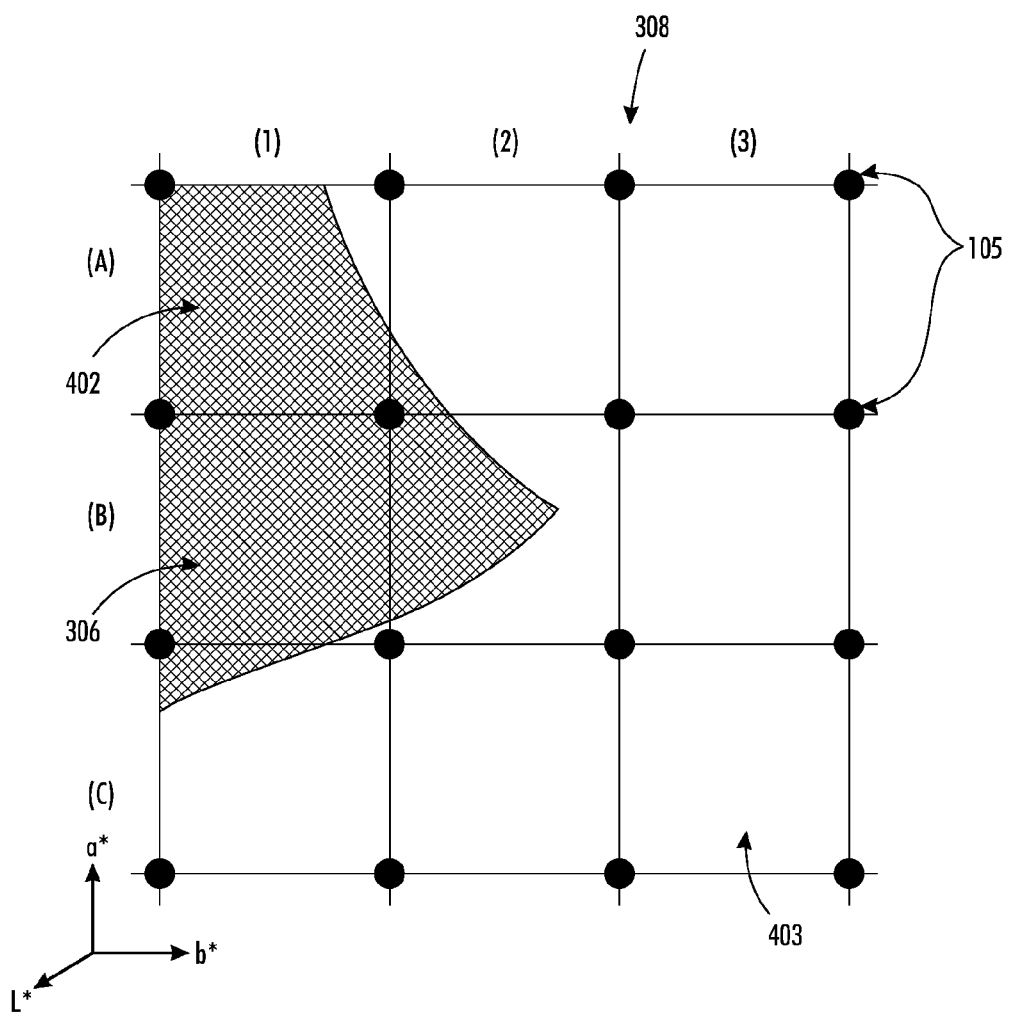
FIG. 4 shows the 3×3 subset of coarse LUT sub-cubes of FIG. 3 wherein coarse LUT sub-cubes are identified which are bisected by a boundary surface of gamut portion 306.

FIG. 4 which shows the 3×3 subset of coarse LUT sub-cubes of FIG. 3. Coarse LUT nodes 105 are at the intersections of the coarse grid levels. For discussion purposes, the 3×3 subset 308 of coarse LUT sub-cubes has been labeled on the left hand column (in the direction of al by letters A, B, C, and along the top row (in the direction of b*) by numerals 1, 2, and 3. In this perspective, the L* axis is perpendicular to the surface of the drawing sheet. Using this notation, coarse LUT sub-cube 402 is labeled A1 and coarse LUT sub-cube 403 is labeled C3. Using this notation, it can be shown that the boundary surface of gamut portion 306 bisects coarse LUT sub-cubes A1, A2, B1, B2, and C1. Coarse LUT sub-cubes A3, B3, C2 and C3 reside entirely outside of gamut portion 306.

Figure 5:
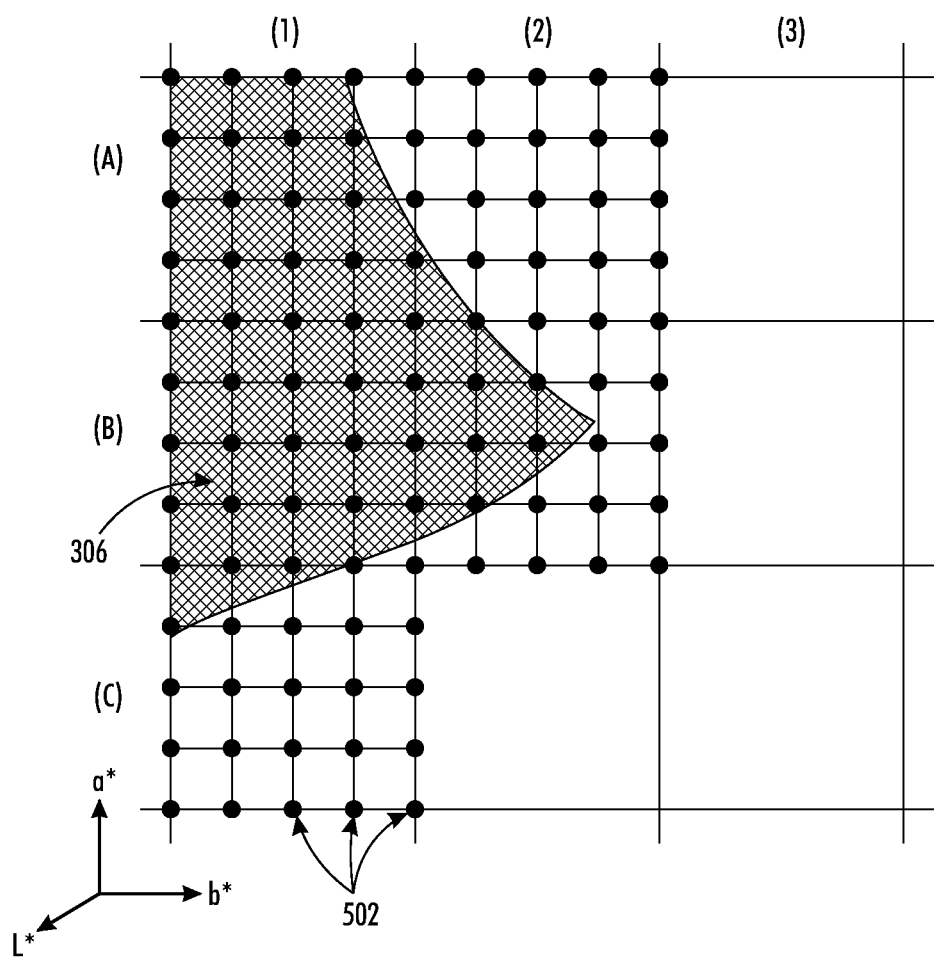
FIG. 5 shows the 3×3 subset of coarse LUT sub-cubes of FIG. 4 in which the identified coarse LUT sub-cubes of FIG. 4 have been populated with fine LUT nodes.

FIG. 5 shows the 3×3 subset of coarse LUT sub-cubes of FIG. 4. Each of the coarse LUT sub-cubes can contain an M×M×M matrix of fine LUT nodes. In the embodiment shown in FIG. 5, M=5. According to the embodiments hereof, fine LUT nodes 502 (and the corresponding output values needed to fill them) will be generated only for coarse LUT sub-cubes A1, A2, B1, B2, and C1.

As will next be described more fully with respect to the flow diagram of FIG. 6, the present method identifies coarse LUT sub-cubes in the structured coarse grid which are bisected by the boundary surface of the gamut. These coarse LUT subcubes are then subdivided into fine LUT sub-cubes, and the corresponding coarse LUT nodes and fine LUT nodes are used to generate a hierarchical multidimensional rendering LUT.

Figure 6:
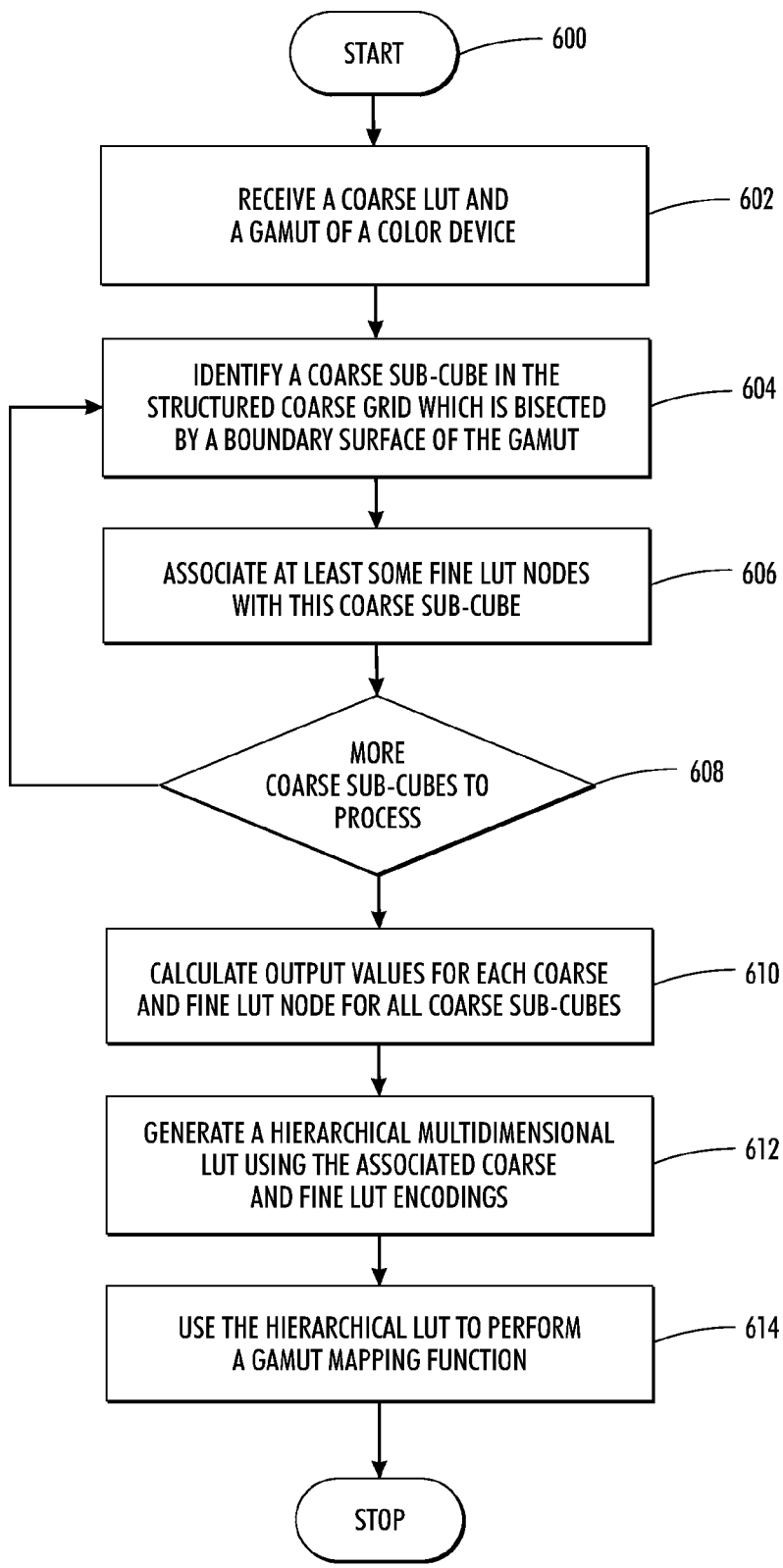
FIG. 6 is a flow diagram of one example embodiment of the present method for generating a hierarchical multidimensional rendering lookup table.

Reference is now being made to the flow diagram of FIG. 6 which illustrates one example embodiment of the present method for generating a hierarchical multidimensional lookup table. Flow processing begins at start 600 and immediately proceeds to step 602.

At step 602, receive a coarse LUT and a gamut of a color device. The coarse LUT has a plurality of coarse LUT sub-cubes arrayed on a plurality of coarse levels on a structured coarse grid. One example structured coarse grid comprising a plurality of sub-cubes is shown in FIG. 1. Each of the coarse LUT sub-cubes has as its vertices a set of coarse LUT nodes. The coarse LUT can be retrieved from a profile of a color device or retrieved from a storage device or from a remote device over a network or from another software module. The gamut may be determined at run-time using, for example, a model of the color device, or a set of measurements obtained using the color device.

At step 604, identify a coarse LUT sub-cube in the structured coarse grid which is bisected by a boundary surface of the gamut. Example coarse LUT sub-cubes which have been identified as being bisected by a boundary surface portion of a gamut are shown and discussed with respect to FIG. 4.

At step 606, associate a fine LUT containing fine LUT nodes that lay on the fine structured grid within this coarse LUT sub-cube. In FIG. 5, coarse LUT sub-cube A1 is associated with a plurality of fine LUT nodes (comprising a 5×5 array, in the illustrated perspective). Calculations for colors that lie within this coarse LUT sub-cube will be done by interpolation within the fine LUT which has finer sampling and is therefore more accurate. In other embodiments, a list of fine and coarse LUT nodes associated with the same color is created so when a CMYK value is calculated for this color, all the nodes in the fine and coarse LUTs that describe that color can be efficiently filled.

Values of each fine LUT node of each fine LUT at an interface between the fine grid and the coarse grid are determined such that a colorimetric-to-device function is continuous across the interface. We must assure the continuity of the color transform at the boundary between a coarse LUT sub-cube that has fine LUT nodes associated with it (for example sub-cube 'A1' of FIG. 5) and one that does not, for example, the coarse LUT sub-cube immediately to the left of sub-cube A1 (as shown in FIG. 3) which we will call sub-cube 'A0', for explanatory purposes. The output value calculated at the boundary must match for the coarse LUT sub-cubes on either side. In sub-cube 'A0', the values at the boundary will be determined by interpolation among the contents of the nodes of A0 on the boundary. The fine LUT in sub-cube A1 will be used to calculate the output on the A1 side of the boundary, and must give the same result at the boundary. Therefore the contents of the fine LUT nodes associated with A1 that lie on the boundary must be calculated by interpolation using the nodes of A0 that lie on the boundary. This simple interpolation method will generally be much more efficient than the techniques that must be used to fill the nodes when the simple interpolation method cannot be applied. Each node may further store an indication of whether or not a CMYK value can be determined by interpolation, as well as an indication of whether this particular node is inside or outside the boundary surface of the gamut. If it is outside the gamut, it can be determined by gamut mapping. These nodes are marked so we can leave them out of the list of the nodes which have CMYK values that must be determined by iteration on the printer. Other determined values such as, for example, at least one device value determined at a LUT node, can be further associated with the LUT node. Each of these data fields can be stored to temporary storage during processing such as a memory or storage device.

At step 608, a determination is made whether any more coarse LUT sub-cubes in the structured coarse grid remain to be processed. If so, then processing repeats with respect to step 604 wherein a next coarse LUT sub-cube is identified which is bisected by the boundary surface of the gamut. This next identified coarse LUT sub-cube is associated with a fine LUT containing the fine LUT nodes that lay on the fine structured grid within this coarse LUT sub-cube. The process repeats in an iterative manner until all of the coarse LUT sub-cubes of the coarse LUT have been processed.

At step 610, calculate output values for each coarse and fine LUT node for all coarse LUT sub-cubes. This can be effectuated using, for instance, regression, inverting a printer model, iterating on the printer, or using any of the other methods well known to those skilled in this art. Gamut mapping techniques can be used for nodes that lie outside the printer gamut. Some of these techniques are discussed in more detail below. The output values (CMYK, for example) are first found for the coarse LUT nodes. Then the fine LUT nodes that can be determined using interpolation are calculated. Finally, the rest of the nodes of the fine LUT are determined.

At step 612, a hierarchical multidimensional LUT is generated using each of the identified sub-cubes and associated coarse and fine LUT encodings. Methods for generating a LUT given all node values are well established. In one embodiment, a binary-valued indicator is stored at each coarse LUT node, taking on one value (e.g. 1) if the corresponding coarse LUT sub-cube traverses a gamut boundary and is thus subdivided into a fine grid, and taking on the other value (e.g. 0) if there is no further subdivision.

At step 614, use the hierarchical multidimensional LUT to perform a color transformation. Thereafter, processing stops. In one embodiment, standard techniques are used to find the coarse LUT sub-cube to which the input color belongs. The said binary-valued indicator at the reference node of that coarse LUT sub-cube then indicates whether interpolation is performed on the coarse or the fine grid. In another embodiment, the generated hierarchical multidimensional LUT can be used to build a highly accurate transform based on a regular 3-dimensional grid for real-time image correction. The hierarchical multidimensional LUT may be provided to a storage device and/or communicating to a color management system. The hierarchical multidimensional LUT may further be used to perform a gamut mapping function.

There are two main ways of finding the formulations discussed above. In one approach a printer model is first found which describes the CMYK to LAB response of the printer. There are several methods that can be used for finding a CMYK formulation, given the desired LAB. However there is usually some error associated with the printer model, and this decreases the accuracy of the rendering LUT. Another way of finding the formulations is to iterate directly on the printer. In this technique, a patch corresponding to a LUT node is printed and its LAB value is measured and compared with the desired one. From this LAB error, a change in CMYK is found that produces an LAB closer to the desired one. In general, 3 to 4 iterations are required to obtain an accurate formulation. This technique eliminates printer model error, but requires a lot more measurements. However, the higher density of grid points created by hierarchical LUT structure where they are needed offers an advantage in the number of patches required for a given accuracy. To illustrate this point, a simulation was performed wherein the results for standard rendering LUTs were compared against a hierarchical rendering LUT. All the rendering LUTs have about the same number of grid points that require iteration to find the formulation. In this simulation, a printer model was inverted using a highly accurate iterative methods to get the formulations for the in gamut grid points of the coarse LUTs and the fine LUTs.

For a standard large set of in gamut test colors ($\geq$4000), the round trip errors (LAB->rendering LUT->printer model->LAB) are:

| iterated colors | coarse LUT levels | fine LUT levels | average error | 95% error | max error | % error > 1 | % error > 2 |
|---|---|---|---|---|---|---|---|
| 1806 | 24 | 0 | 0.51 | 1.13 | 2.09 | 8.91 | 0.05 |
| 1886 | 17 | 3 | 0.42 | 0.90 | 2.25 | 3.00 | 0.20 |
| 2054 | 25 | 0 | 0.48 | 1.06 | 1.99 | 6.68 | 0.00 |

Of these error metrics, the key one is the fraction of the colors with visible errors (DE2000 error>1). For a hierarchical LUT with 17 coarse levels and 3 fine levels per coarse LUT sub-cube, only 3% of the colors have visible errors, while standard rendering LUTs (no fine LUTs) with 24 and 25 levels show a much higher percentage of colors with visible errors.

Although accuracy can only be reasonably defined for in-gamut test colors, formulations must still be found for all out-of-gamut grid points in the rendering LUTs. In this simulation, this was effectuated by gamut mapping. The surface of the gamut is described by a triangular tessellation in LAB space. CMYK values are stored in each of the vertices of the triangles, so when the desired gamut mapped LAB value is found, the corresponding CMYK value can be found by interpolation. Since it is generally known, a priori, which CMYK formulations are on the boundary of the gamut, if you do not have a printer model, you can print a grid of these surface CMYK values and measure their LAB values to determine the surface of the gamut. No iteration is required. The same number of measurements would be required for both standard and hierarchical LUTs.

Some or all of the computations necessary to perform various aspects of the method hereof may be performed on or by a programmable general purpose computer, special purpose computer, program microprocessor or microcontroller, or other like digital signal processing devices. These other like digital signal processor may include, but are not limited to, peripheral integrated circuit elements, ASIC, or other integrated circuits, hard-wired electronic or logic circuit, or the like, or may even be manipulated through manual adjustment of one or more operating parameters and/or user-adjustable input parameters that may be associated with one or more of the operating parameters of the system and methods disclosed. It should be appreciated that, given the required inputs, to include, but not be limited to, appropriate information regarding thresholds and/or inputs regarding device settings, and the like, and may include inputting software algorithms or any combination of software, hardware and/or firmware control parameters to implement the individual devices and/or modules hereof in varying combinations. One such special purpose computer is shown and described with respect to FIG. 8.

Figure 7:
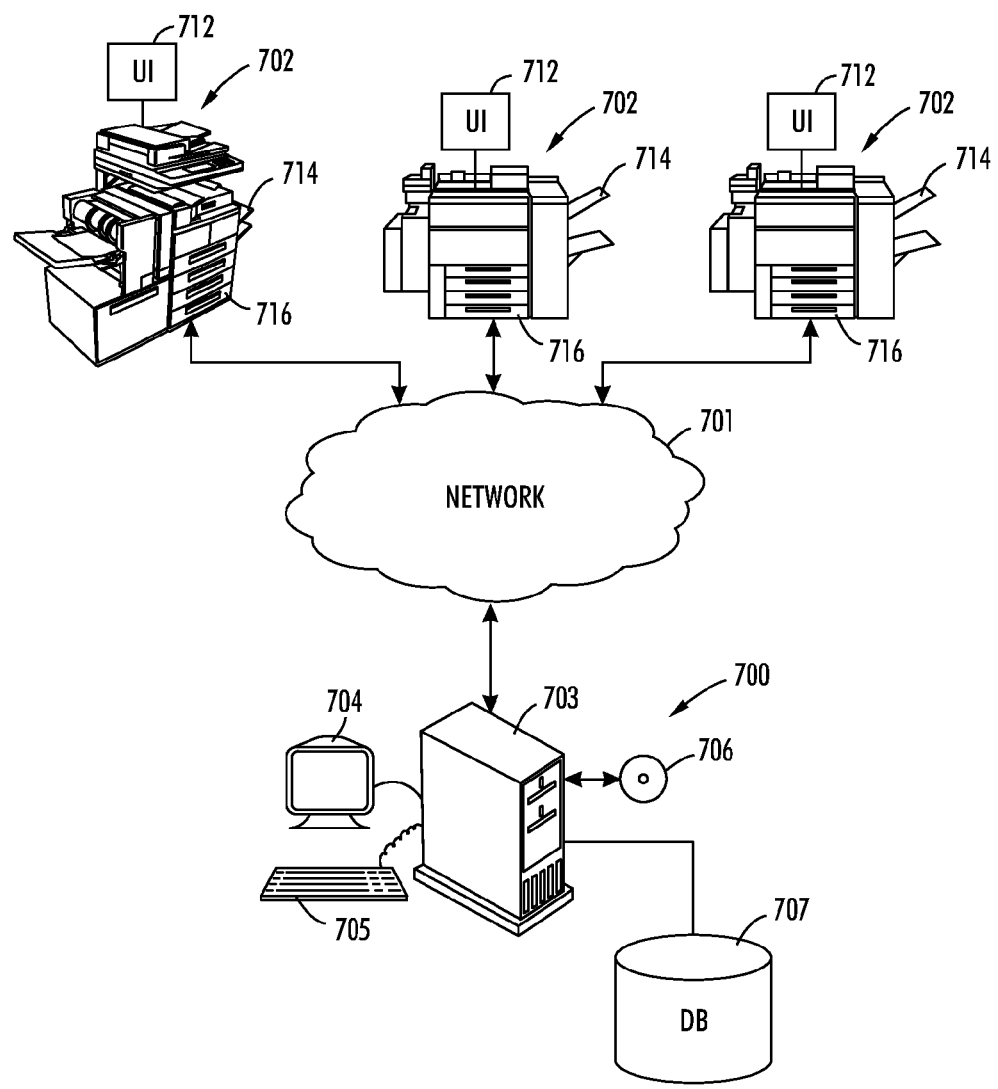
FIG. 7 illustrates one example computer platform in digital communication with a plurality of multi-function document reproduction devices wherein various color transforms utilizing the hierarchical multidimensional LUT generated hereby would be performed.

Reference is now made to FIG. 7 which illustrates one example computer platform in networked digital communication with a plurality of multi-function document reproduction devices wherein various color transforms utilizing the hierarchical multidimensional LUT generated hereby would likely be performed.

Computer platform 700 is in digital communication with a plurality of multi-function devices 702 over a network connection shown as amorphous cloud 701. Techniques for placing computers in network communication with digital devices are well established. Therefore, a discussion as techniques for placing such systems and devices in network communication has been omitted. Computer workstation 700 is shown comprising a computer case 703 housing therein a motherboard, CPU, memory, storage device, and a communications link such as a network card. The computer workstation also includes a display 704 such as a CRT or LCD. An alphanumeric keyboard 705 and a mouse (not shown). Also shown is computer program product 706 containing machine readable program instructions for implementing various aspects of the present method as described above with respect to the flow diagram of FIG. 6. Computer system 700 further includes storage device 707, as is known in the arts, wherein various data, variables, and other information needed to perform the methods hereof can be retained or retrieved. Each of the multi-function document reproduction devices 702 includes a user interface (UI) 712. The UI includes a touch-screen display for receiving user input via a touch-sensitive surface, and may further include any of a keyboard, keypad, mouse, and the like. In the embodiment shown, the multi-function devices 702 include a paper tray 714 for document input, and trays 716 for retaining a variety of media. Such devices are capable of performing a print/copy job function as is generally known in the document reproduction arts. Various aspects of the present method are preformed in an image processing system or color management system which may reside, in whole or in part, within any of the document reproduction devices 702, the workstation 700, or in a remote device over network 701. Any of the networked devices may include an Ethernet or similar card to connect to network 701 using, for example, a modem. Typical network interface cards found in the arts also enable one or more of the functionality of, for example, special purpose systems such as a Local Area Network (LAN) and Wireless Area Network (WAN) functionality.

It should be appreciated that any of the functionality of the present method may be implemented on a special purpose computer, a programmed micro-processor or micro-controller and peripheral integrated circuit element, an ASIC or other integrated circuit, a digital signal processor, a hard-wired electronic or logic circuit such as a discrete element circuit, a programmable logic device such as a PLD, PLA, FPGA, PAL, or the like. In general, any device capable of implementing a finite state machine that is in turn capable of implementing the flowcharts hereof or appropriate portions thereof. The particular form each of the modules will take is a design choice and will be obvious and predictable to those skilled in the art. Furthermore, the disclosed method may be implemented, in part, in software using object or object-oriented software development environments that provide portable source code that can be used on a variety of computer or workstation hardware platforms. Alternatively, the disclosed method may be implemented partially or fully in hardware using logic circuits in conjunction with a spectrophotometric device. Moreover, various aspects of the disclosed method may be implemented as software executed on a programmed general purpose computer, a special purpose computer, a micro-processor, or the like. The methods described above can be readily implemented in hardware or software using any known or later developed systems or structures, devices and/or software by those skilled in the applicable art without undue experimentation from the functional description provided herein together with a general knowledge of the computer arts.

Figure 8:
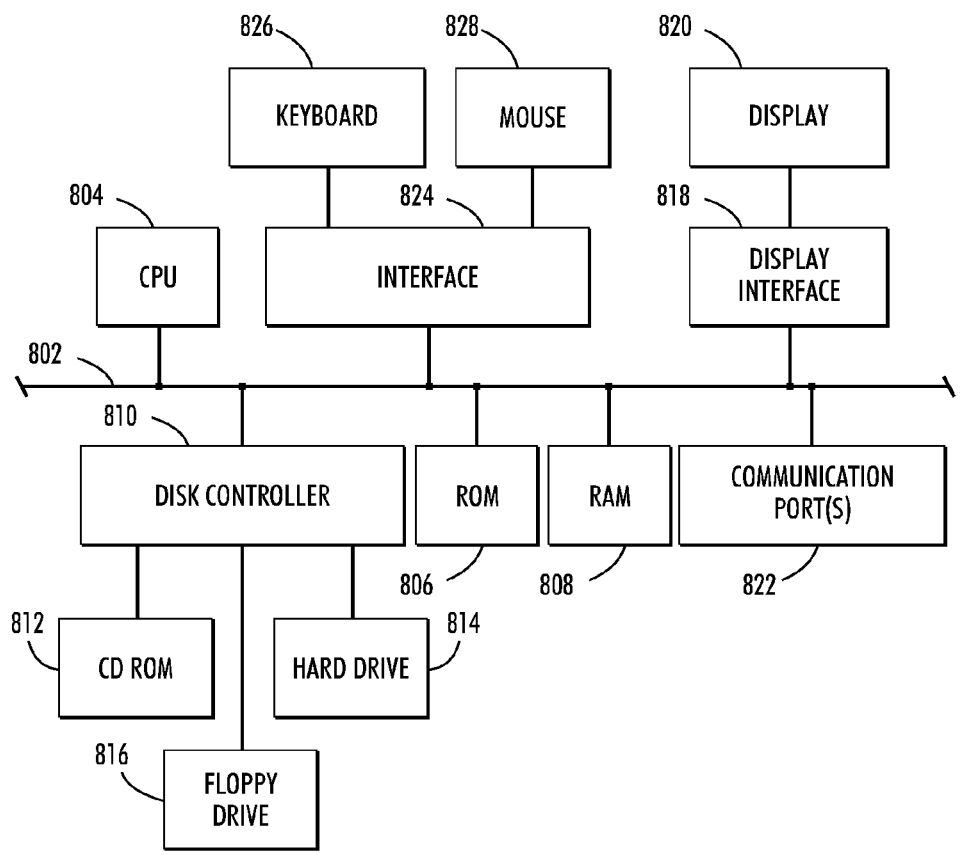
FIG. 8 illustrates a block diagram of one example embodiment of a special purpose computer system for implementing one or more aspects of the present method as described with respect to the flow diagram of FIG. 6.

Reference is now being made to FIG. 8 which illustrates a block diagram of one example embodiment of a special purpose computer system for implementing one or more aspects of the present method as described with respect to the flow diagrams hereof. Such a special purpose processor is capable of executing machine executable program instructions.

In FIG. 8, communications bus 802 serves as an information highway interconnecting the other illustrated components of special purpose computer system 600 which incorporates a central processing unit (CPU) 804 capable of executing machine readable program instructions for performing any of the calculations, comparisons, logical operations, and other program instructions for performing any of the steps described above with respect to the flow diagrams and illustrated embodiments hereof. Processor 804 is in communication with memory (ROM) 806 and memory (RAM) 808 which, collectively, constitute example storage devices. Such memory may be used to store machine readable program instructions and other program data and results to sufficient to carry out any of the functionality described herein with respect to the flow diagram of FIG. 7. Disk controller 810 interfaces with one or more storage devices 814. These storage devices may comprise external memory, zip drives, flash memory, USB drives, or other devices such as CD-ROM drive 812 and floppy drive 816. Storage device 814 may store machine executable program instructions for executing the methods hereof. Such storage devices may be used to implement a database wherein various records are stored. Display interface 818 effectuates the display of information on display 820 in various formats such as, for instance, audio, graphic, text, and the like. Interface 824 effectuates a communication via keyboard 826 and mouse 828, collectively a graphical user interface. Such a graphical user interface is useful for a user to enter information about any of the displayed information in accordance with various embodiments hereof.

Communication with external devices may occur using example communication port(s) 822. Such ports may be placed in communication with any of the example networks shown and described herein, such as the Internet or an intranet, either by direct (wired) link or wireless link, as shown and discussed with respect to the networked configuration of FIG. 7. Example communication ports include modems, network cards such as an Ethernet card, routers, a PCMCIA slot and card, USB ports, and the like, capable of transferring data from one device to another. Software and data is transferred via the communication ports in the form of signals which may be any of digital, analog, electromagnetic, optical, infrared, or other signals capable of being transmitted and/or received by the communications interface. Such signals may be implemented using, for example, a wire, cable, fiber optic, phone line, cellular link, RF, or other signal transmission means presently known in the arts or which have been subsequently developed.

Computer readable media is understood to be a machine readable media capable of having embodied thereon various program instructions or other machine executable codes or commands that implement and facilitate the function, capability, and methods described herein. A computer readable medium may additionally comprise computer readable information in a transitory state such as a network link and/or a network interface, including a wired network or a wireless network, which allows the computer system to read such computer readable information. Computer programs (also called computer control logic) may be stored in memory. Computer programs may also be received via a communications interface or bus. A computer readable medium is also capable of storing data, machine instructions, message packets, or other machine readable information, and may include non-volatile memory. Such computer programs, when executed, enable the computer system to perform one or more aspects of the above-described methods.

It will be appreciated that the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings hereof can be implemented in hardware or software using any known or later developed systems, structures, devices, and/or software by those skilled in the applicable art without undue experimentation from the functional description provided herein with a general knowledge of the relevant arts.

Moreover, the methods hereof can be implemented as a routine embedded on a personal computer or as a resource residing on a server or workstation, such as a routine embedded in a plug-in, a photocopier, a driver, a scanner, a photographic system, a xerographic device, or the like. The methods provided herein can also be implemented by physical incorporation into an image processing or color management system. Furthermore, the teachings hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs or leverage off-the-shelf computer graphics software such as that in Windows, Java, or from a server or hardware accelerator or other image processing devices.

One or more aspects of the methods described herein are intended to be incorporated in an article of manufacture, including one or more computer program products, having computer usable or machine readable media. The article of manufacture may be included on at least one storage device readable by a machine architecture or other xerographic or image processing system embodying executable program instructions capable of performing the methodology described herein. The article of manufacture may be included as part of a xerographic system, an operating system, a plug-in, or may be shipped, sold, leased, or otherwise provided separately either alone or as part of an add-on, update, upgrade, or product suite.

It will be appreciated that various of the above-disclosed and other features and functions, or alternatives thereof, may be combined into other systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting.

Various changes to the above-described embodiments may be made without departing from the spirit and scope of the invention. The teachings of any printed publications including patents and patent applications, are each separately hereby incorporated by reference in their entirety.

What is claimed is:

1. A method for generating a hierarchical rendering lookup table for implementing a color transformation within a color imaging system, the method comprising:
   receiving a coarse look-up table (LUT) and a gamut of a color device, said coarse LUT comprising a plurality of coarse LUT nodes arrayed on a plurality of coarse levels on a structured coarse grid;
   identifying at least one coarse LUT sub-cube within said structured coarse grid that is bisected by a boundary surface of said gamut;
   associating at least one fine LUT containing fine LUT nodes that lay on a fine structured grid within each of said identified at least one coarse LUT sub-cube, wherein values of each associated fine LUT node are determined such that a colorimetric-to-device function is continuous across an interface between said structured fine grid and said structured coarse grid;
   determining output values for each coarse and fine LUT node of each of said identified at least one coarse LUT sub-cube; and
   generating a hierarchical LUT from said identified at least one coarse LUT sub-cube and said associated fine LUT nodes.

2. The method of claim 1, further comprising using said hierarchical LUT to construct a highly accurate transform for real-time image correction.

3. The method of claim 1, further comprising associating with any of said coarse and fine LUT nodes a list of fine and coarse LUTs in which it can be found.

4. The method of claim 1, further comprising associating with any of said fine LUT nodes an indication whether or not a CMYK value can be determined by interpolation.

5. The method of claim 1, further comprising any of:
   associating with any of said coarse LUT nodes a binary-valued indicator as to whether or not the associated coarse LUT sub-cube traverses a gamut boundary, and
   associating with any of said coarse and fine LUT nodes an indication of whether said associated coarse and fine LUT node is inside or outside a boundary of said gamut.

6. The method of claim 1, further comprising associating a device formulation that can make a specified color at any of said coarse LUT nodes and said fine LUT nodes.

7. The method of claim 1, wherein said gamut is determined at run-time using any of: a model of said color device, and a set of measurements obtained using said color device.

8. The method of claim 1, further comprising using said hierarchical LUT to perform a color transformation.

9. A system for generating a hierarchical rendering lookup table for implementing a color transformation within a color imaging system, said system comprising:
   a memory and a storage device; and
   a processor in communication with said storage device and said memory, said processor executing machine readable instructions for performing the method of:
      receiving a coarse look-up table (LUT) and a gamut of a color device, said coarse LUT comprising a plurality of coarse LUT nodes arrayed on a plurality of coarse levels on a structured coarse grid;
      identifying at least one coarse LUT sub-cube within said structured coarse grid that is bisected by a boundary surface of said gamut;
      associating at least one fine LUT containing fine LUT nodes that lay on a fine structured grid within each of said identified at least one coarse LUT sub-cube, wherein values of each associated fine LUT node are determined such that a colorimetric-to-device function is continuous across an interface between said structured fine grid and said structured coarse grid;
      determining output values for each coarse and fine LUT node of each of said identified at least one coarse LUT sub-cube; and
      generating a hierarchical LUT from said identified at least one coarse LUT sub-cube and said associated fine LUT nodes.

10. The system of claim 9, further comprising using said hierarchical LUT to construct a highly accurate transform for real-time image correction.

11. The system of claim 9, further comprising associating with any of said coarse and fine LUT nodes a list of fine and coarse LUTs in which it can be found.

12. The system of claim 9, further comprising associating with any of said fine LUT nodes an indication whether or not a CMYK value can be determined by interpolation.

13. The system of claim 9, further comprising any of:
   associating with any of said coarse LUT nodes a binary-valued indicator as to whether or not the associated coarse LUT sub-cube traverses a gamut boundary, and
   associating with any of said coarse and fine LUT nodes an indication of whether said associated coarse and fine LUT node is inside or outside a boundary of said gamut.

14. The system of claim 9, further comprising associating a device formulation that can make a specified color at any of said coarse LUT nodes and said fine LUT nodes.

15. The system of claim 9, wherein said gamut is determined at run-time using any of: a model of said color device, and a set of measurements obtained using said color device.

16. The system of claim 9, further comprising using said hierarchical LUT to perform a color transformation.

17. A computer implemented method for generating a hierarchical rendering lookup table for implementing a color transformation within a color imaging system, the method comprising:
   receiving a coarse look-up table (LUT) and a gamut of a color device, said coarse LUT comprising a plurality of coarse LUT nodes arrayed on a plurality of coarse levels on a structured coarse grid;
   identifying coarse LUT sub-cubes within said structured coarse grid that are bisected by a boundary surface of said gamut;
   associating a fine LUT containing fine LUT nodes that lay on a fine structured grid within each respective identified coarse LUT sub-cube, wherein values of each associated fine LUT node are determined such that a colorimetric-to-device function is continuous across an interface between said structured fine grid and said structured coarse grid;
   determining output values for all coarse and fine LUT nodes of said identified coarse LUT sub-cubes wherein values of each fine LUT node are determined such that a colorimetric-to-device function is continuous across an interface between said structured fine grid and said structured coarse grid; and
   generating a hierarchical LUT from said identified coarse LUT sub-cubes and said associated fine LUT nodes.

18. The method of claim 17, further comprising associating with any of said fine or coarse LUT nodes any of:
   a list of fine and coarse LUTs in which it can be found;
   an indication whether or not a CMYK value can be determined by interpolation;

a binary-valued indicator as to whether or not said associated coarse LUT sub-cube traverses a gamut boundary;

an indication of whether said associated coarse and fine LUT node is inside or outside a boundary of said gamut; and a device formulation that can make a specified color.

19. The method of claim 17, wherein said gamut is determined at run-time using any of: a model of said color device, and a set of measurements obtained using said color device.

20. The method of claim 17, further comprising using said hierarchical LUT to perform a color transformation.

21. The method of claim 17, further comprising using said hierarchical LUT to construct a highly accurate transform for real-time image correction.

\* \* \* \* \*